April 23, 1946.                L. BOLLE                 2,399,092
                 AIR OR WATERTIGHT DEVICE FOR TIMEPIECES
                         Filed April 18, 1944
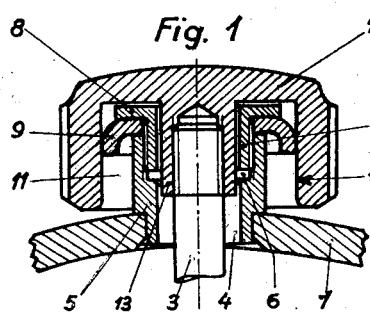
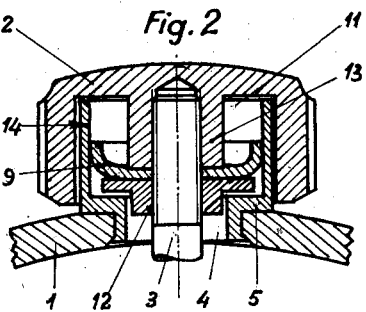
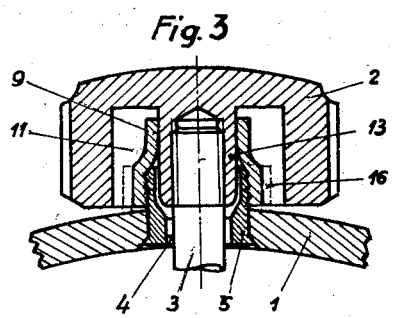
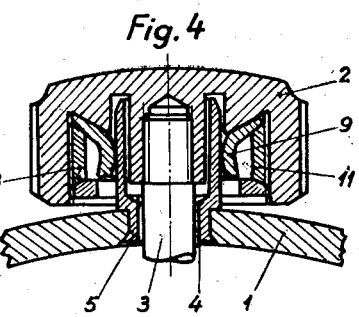
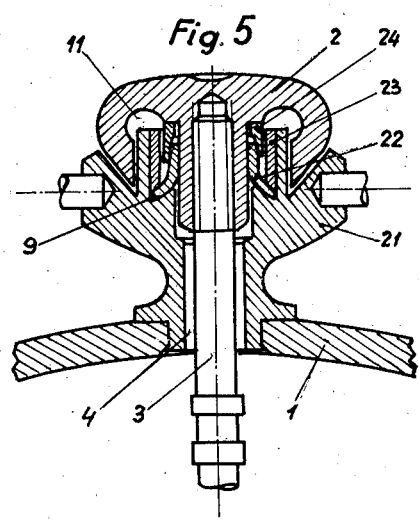
INVENTOR
LEON BOLLE
BY
ATTORNEYS Patented Apr. 23, 1946

2,399,092

UNITED STATES PATENT OFFICE 2,399,092

AIR OR WATERTIGHT DEVICE FOR TIMEPIECES

Léon Bolle, Geneva, Switzerland

Application April 18, 1944, Serial No. 531,673
In Switzerland March 24, 1943

1 Claim. (Cl. 58—90)

When seeking to ensure the tightness of a clockwork-piece around the control device where it traverses the wall of the case, it is essential to reduce to a minimum the friction which the device for rendering air and water-tight opposes to the movements of the control device and to allow the said device to take as freely as possible whatever position its connections with the mechanism imposes to it.

Most of known devices rendering joints air or water-tight comprise a packing of elastic material which an axial pressure tends to press against the lateral walls of the clearance or joint which has to be rendered air or water-tight as in a packing-box. But in such cases the control device, guided in a packing which is rendered practically rigid, when compressed as mentioned above, cannot take freely the positions which its other connections impose upon it. Moreover, if in such devices one wishes to reduce friction to a minimum, it becomes necessary to provide means for adjusting the axial compression on the packing to take up not only the wear of the packing but also the irregularities which occur in the manufacture of the various parts of the device.

Other air or water-tight devices have been proposed in which at least a part of the packing of which the internal wall is cylindrical over its whole length, is placed with a certain amount of play in a recess machined in the crown, the packing being provided on the outside with a projection which is clamped between a shoulder of the recess and a fastening piece carried by the crown. With this construction, friction is not to the same degree caused by irregularities in manufacture, but the inconveniences remain nevertheless practically the same as in the case of the first mentioned devices owing to the fact that the packing, on the part which is compressed, is subject to the same conditions as an ordinary packing-box.

The best air or water-tight devices known at present are those in which the non-metallic element which stops the gap or joint, is made in the shape of a membrane i. e. by an annular washer of thickness small compared to the length of its median section and having two faces and two distinct edges. The material from which this membrane is cut out is supple, that is to say, can be deformed, but is itself endowed with a certain elasticity and is impermeable, so that it is capable to maintain by its faces an air or water-tight contact with the parts of the clockwork-piece on either side of the joint or clearance during all the movements of the control device.

The air or water-tight devices of this type known at present comprise a membrane of which both edges remain in contact with the two parts of the clockwork-piece but without any axial slip or displacement relative to these pieces during all the axial movements of the control device. Consequently the membrane must be comparatively large and possesses considerable elasticity to allow the said movement between its two edges to occur.

The present invention concerns an air or water-tight device of the last mentioned type from which the inconveniences mentioned have been eliminated by the fact that the membrane is, on the one hand firmly secured by one of its edges only, to one part of the clockwork-piece, and on the other hand establishes an air or water-tight but slipping contact by a portion on one of its faces, with a cylindrical surface of the other part of the clockwork-piece. The relative positions, on the said membrane, between the edge which is secured to one part of the clockwork-piece and the portion of the face of the membrane which is in slipping or sliding contact with the other part of the clockwork-piece, are chosen so that the control device can freely take any position which its connections with the mechanism impose upon it, and so that the membrane operates like a one-way valve which is applied more firmly against its contact surface as the external pressure increases.

The drawing annexed shows in diagrammatic form and by way of example some forms of embodiment of an air or water-tight device according to the invention.

Fig. 1 shows a cross-sectional view of a first form of execution of the device.

Fig. 2 shows a cross-sectional view of an alternative form of execution of the device.

Fig. 3 shows a cross-sectional view of a second form of execution of the device.

Fig. 4 shows a cross-sectional view of a third form of execution of the device.

Fig. 5 shows a cross-sectional view of a fourth form of execution of the device.

In the device shown in Fig. 1, I represents the case of a watch traversed by a control device constituted by a winder comprising a crown 2 and a spindle 3. This spindle 3 passes into the case through a bore 4 of a tube 5 rigidly secured to the case. The winder on the one hand, and the case with its tube on the other hand, constitute the two parts of the clockwork-piece between which remains the gap or joint which has to be closed or sealed. A thread is cut inside the free end of the tube 5 which is intended to receive securing means. The said means comprise a threaded tube 7 provided with a shoulder 8. An annular membrane 9 having the shape of a simple flat and even washer made out of a material which is supple, that is to say which can be deformed, but which is itself endowed with a certain elasticity and which is impermeable, is rendered solid with the case by its inner edge being clamped between the shoulder 8 and the external end face of tube 5. The outside diameter of the membrane is such that one of its faces can be applied by its elasticity against the smooth cylindrical wall 10 of recess 11 of the crown 2.

The mounting in place of this air or watertight device is simple. Once membrane 9 has been secured by clamping its inner edge, the winder is set in position. Then the membrane 9 automatically takes the shape shown in Fig. 1, the said shape making a one-way valve by which an increase of the external pressure will tend to apply more firmly the membrane against its contact surfaces. Owing to the flexibility of the membrane and to the distance which separates the edge which is secured to one part of the clockwork-piece from the portion of the membrane face which is in slipping and sliding contact with the other part of the clockwork-piece, the control device can practically take freely any position which its connections with the mechanism imposes upon it, anyway for movements limited by the joint or clearance which must necessarily be provided for the passage through the wall of the case.

The friction which this device opposes to the movement of the winder is necessarily very small since the contact pressure is due solely to the elasticity of the membrane. The part of the membrane surface which is in sliding contact with one of the clockwork-pieces is moreover sufficiently distant from the edge of the membrane which is rigidly secured to the other clockwork-piece so as not to be influenced by the greater or lesser clamping pressure imposed by the said edge secured to tube 5 of the case.

The form of embodiment shown in Fig. 2 is an alternative to that shown on Fig. 2. Here again the membrane has the shape of a washer, but in this case the membrane is secured to the winder, its inner edge being clamped between a threaded nut 12 secured on to the spindle 3 and the front face of a tube 13 integral with the crown 2. The membrane 9 is applied elastically by one of its faces against a cylindrical surface 14 fixed with reference to the case, the said surface being constituted by a smooth wall of a bore machined in tube 5 which is, for this purpose, enlarged at its free extremity.

In the form of execution represented in Fig. 3 the membrane 9 is constituted by a part of a cylindrical tube having an inner diameter smaller than the external diameter of tube 13 with which the crown is provided. One extremity of the membrane is forced on to the free extremity of tube 5 thereby securing it by one of its edges to one part of the clockwork-piece. If the circumferential elasticity of the annular membrane alone is considered insufficient to obtain a satisfactory adhesion of the membrane, it is possible to increase this adhesion by forcing over the external face of the membrane a ring 16, as shown in dotted lines in Fig. 3. This ring ensures a better securing of the membrane and at the same time protects the membrane against damage due to a finger-nail for example. When the crown is assembled on the spindle, the tube 13, which extremity is provided with corners rounded off to facilitate its entrance, is forced into the free end of the membrane which dilates slightly and thereby gives rise to a slight elastic pressure between the two faces of the slipping contact.

This form of execution has evidently the same advantages as those described above. However the thickness of the membrane must in this case be sufficient to have a certain stiffness which will avoid its collapsing or folding over while the winder is being assembled.

One could also provide an alternative arrangement which would be the inverse of the preceeding one; this alternative is not represented in the annexed drawing but would also comprise a tubular membrane which however would be secured to the winder and have a slipping contact with a cylindrical surface machined for that purpose in tube 5 of the case.

The membrane can also have other annular shapes than those described above, in which its profile, in a section through the centerline, is not rectangular or in which the thickness of the profile is not constant, in order for example to increase its stiffness or to facilitate the mounting of the membrane and control device. In such cases however, other methods have to be adopted for the manufacturing of the membrane (moulding, machining, etc.)

Fig. 4 shows another form of execution in which membrane 9 has the shape of a body of revolution obtained by moulding for example. The membrane is funnel shaped at one extremity and tubular at the other. It is rigidly secured by its enlarged edge which is clamped between the bottom of recess 11 and a nut 18 screwed into the crown. The bottom of the internal recess 11 of crown 2 is preferably beveled or made conical, as shown, to receive membrane 9. The tubular extremity of the membrane makes a slipping contact with the external surface of tube 5. With this arrangement, the membrane is much less likely to collapse or fold over when the winder is set into place because it is supported by its entire conical surface on the bottom of recess 11.

Fig. 5 shows a fourth form of embodiment of the invention, applied to a watch provided with a hanger 21. Membrane 9 has the same shape as in the preceding form of embodiment of Fig. 4, but is placed inside a recess 22 of the hanger 21. It is secured to the case by being clamped by its conical extremity between the bottom of the recess 22 and the front part of a ring 23 pressed in the said recess. The slipping contact of its tubular extremity is assured over the cylindrical tube 13 of the crown 2 by the peripheral elasticity of the membrane. If for any reason one wishes to increase the tightness of this slipping contact by more mechanical means, one can as shown in Fig. 5, provide a ring 24 slipped freely over the tube 13 of the crown, which caps the upper extremity of the membrane and tends to increase the pressure on the sliding contact. By a judicious choice of the taper or angle of aperture on the internal cone of ring 24 on the one hand and of the total height of membrane 9 on the other hand, one can vary at will the intensity of the additional pressure. If the taper of the cone is sufficiently small, ring 24 adheres to membrane 9 during all the control displacements of the control spindle. If, on the contrary, the taper of the cone is increased until its inner surface is practically even, the effect above described can only take place when the control device is set in position for winding the watch, in this extreme case the membrane is subjected to a longitudinal pressure which owing to the transverse curvature of the membrane, tends to apply the said membrane more firmly to its sliding contact surface.

In all the forms of execution described above, the control device is represented in the shape of the crown of a watch bearing its winder spindle. This same air or water-tight device however can be applied to any other control device effecting similar movements, as for example the push-buttons of a chronograph. In the case last mentioned, since the control device can only move axially, the membrane need not necessarily have a circular cross-section; it should however have a slipping contact with a tubular, but not circular, surface of one part of the clockwork-piece.

The application of the invention is furthermore not limited only to clockwork-pieces provided with a hanger or a tube protruding or emerging from the case. When the size of the case allows it, an air or water-tight device of the type described above, can very well be arranged in a recess machined out in the thickness of the wall of the box, as is current practice for other known types of air or water-tight devices.

I claim:

In a sealing structure for a watch case, a case, a winder element comprising a crown and a spindle carried by said crown and freely traversing said case, an engaging element fixedly carried by said case, a tubular resilient packing member, clamping means carried by a first one of said elements for fixedly clamping thereto one edge of said tubular member, said member being so held by said elements and said retaining means that said member is substantially deformed and that an engaging portion of said member remote from its said clamped edge makes tight slipping contact with the second one of said elements, and a beveled clamping ring fixedly carried by the second one of said elements and adapted by its beveled edge to apply slipping pressure to said member for increasing the tightness of its slipping contact with said second element.

LÉON BOLLE.